US007796603B1

United States Patent
Bertone et al.

(10) Patent No.: US 7,796,603 B1
(45) Date of Patent: Sep. 14, 2010

(54) METHOD AND SYSTEM FOR CONTROLLING MEDIA SESSIONS IN NETWORKS THAT USE COMMUNICATION PROTOCOLS WITH DISTINCT SIGNALING AND MEDIA CHANNELS

(75) Inventors: Kurt R. Bertone, Hollis, NH (US); Kenneth A. Kuenzel, Sudbury, MA (US)

(73) Assignee: Acme Packet, Inc., Burlington, MA (US)

( * ) Notice: Subject to any disclaimer, the term of this patent is extended or adjusted under 35 U.S.C. 154(b) by 1183 days.

(21) Appl. No.: 10/905,646

(22) Filed: Jan. 14, 2005

(51) Int. Cl.
  *H04L 12/28* (2006.01)
(52) U.S. Cl. .................................. 370/395.2
(58) Field of Classification Search .................. 370/469
  See application file for complete search history.

(56) References Cited

U.S. PATENT DOCUMENTS

| 6,735,621 | B1 | 5/2004 | Yoakum et al. | |
|---|---|---|---|---|
| 2002/0181424 | A1* | 12/2002 | Shaheen et al. | 370/338 |
| 2003/0035401 | A1* | 2/2003 | Shaheen et al. | 370/341 |
| 2003/0193696 | A1* | 10/2003 | Walker et al. | 358/402 |
| 2004/0013112 | A1 | 1/2004 | Goldberg et al. | |
| 2004/0131042 | A1* | 7/2004 | Lillie et al. | 370/351 |
| 2005/0060368 | A1 | 3/2005 | Wang et al. | |
| 2005/0160152 | A1* | 7/2005 | Selin et al. | 709/217 |
| 2005/0237931 | A1* | 10/2005 | Punj et al. | 370/229 |

OTHER PUBLICATIONS

Handley et al, "SDP: Session Description Protocol", Internet Request for Comment (RFC) 2327, Apr. 1998.
Rosenberg et al, "SIP: Session Initiation Protocol", Internet Request for Comment (RFC) 3261, Jun. 2002.
Rosenberg et al., "An Offer/Answer Model With The Session Description Protocol (SDP)", Internet Request for Comment (RFC) 3264, Jun. 2002.

* cited by examiner

*Primary Examiner*—Chirag G Shah
*Assistant Examiner*—Otis L Thompson, Jr.
(74) *Attorney, Agent, or Firm*—Thomas, Kayden, Horstemeyer & Risley, LLP (57) ABSTRACT

A media control system (MCS) enforces media control policies on systems that conform to the relevant protocol specifications (such as SIP and SDP), for example, by interpreting and potentially modifying or destroying the SDP offers embedded in the SIP signaling messages that traverse it. This enables the MCS to exercise control over SIP-associated media sessions without necessarily inserting itself into the media streams themselves. The MCS can enforce media control policies that are based either directly on information that is explicitly contained in SDP message bodies or on secondary information that can be derived from information that is contained in the SDP messages.

19 Claims, 7 Drawing Sheets

```
[1]    v=0
[2]    o=uapa 3310748414 3310748414 IN IP4 192.168.1.1
[3]    s=SIP Call
[4]    c=IN IP4 192.168.1.1
[5]    t=0 0
[6]    m=audio 5004 RTP/AVP 8 0 4 15
```

Figure 3

| Payload Type | Encoding Name | Media Type | Clock Rate | Audio Channels |
|---|---|---|---|---|
| 0 | PCMU | A | 8000 | 1 |
| 1 | Reserved | | | |
| 2 | Reserved | | | |
| 3 | GSM | A | 8000 | 1 |
| 4 | G723 | A | 8000 | 1 |
| 5 | DVI4 | A | 8000 | 1 |
| 6 | DVI4 | A | 16000 | 1 |
| 7 | LPC | A | 8000 | 1 |
| 8 | PCMA | A | 8000 | 1 |
| 9 | G722 | A | 8000 | 1 |
| 10 | L16 | A | 44100 | 2 |
| 11 | L16 | A | 44100 | 1 |
| 12 | QCELP | A | 8000 | 1 |
| 13 | CN | A | 8000 | 1 |
| 14 | MPA | A | 90000 | * |
| 15 | G728 | A | 8000 | 1 |
| 16 | DVI4 | A | 11025 | 1 |
| 17 | DVI4 | A | 22050 | 1 |
| 18 | G729 | A | 8000 | 1 |
| 19 | reserved | A | | |
| 20 | unassigned | A | | |
| 21 | unassigned | A | | |
| 22 | unassigned | A | | |
| 23 | unassigned | A | | |
| 24 | unassigned | V | | |
| 25 | CelB | V | 90000 | * |
| 26 | JPEG | V | 90000 | * |
| 27 | unassigned | V | | |
| 28 | nv | V | 90000 | * |
| 29 | unassigned | V | | |
| 30 | unassigned | V | | |
| 31 | H261 | V | 90000 | * |
| 32 | MPV | V | 90000 | * |
| 33 | MP2T | AV | 90000 | * |
| 34 | H263 | V | 90000 | * |
| 35--71 | unassigned | ? | | |
| 72--76 | reserved | * | | |
| 77--95 | unassigned | ? | | |
| 96—127 | dynamic | ? | | |

* Consult applicable Request for Comments (RFC) for additional information

Figure 4

```
[1]    v=0
[2]    o=uana 3310748414 3310748414 IN IP4 192.168.1.1
[3]    s=SIP Call
[4]    c=IN IP4 192.168.1.1
[5]    t=0 0
[6]    m=audio 5004 RTP/AVP 96 97 98
[7]    a=rtpmap:96 G726-16/8000/1
[8]    a=rtpmap:97 G726-24/8000/1
[9]    a=rtpmap:98 G729D/8000/1
```

Figure 5

```
[1]    INVITE sip:uan.b@example.org SIP/2.0
[2]    Via: SIP/2.0/UDP 192.168.1.1;branch=z9hG4bKc1e3619e0b12d5de
[3]    From: UAP A <sip:uan.a@example.org>;tag=fe9f0003c189627f
[4]    To: UAP B <sip:uan.b@example.org>
[5]    Contact: <sip:uan.a@example.org>
[6]    Call-ID: a40c1f0d241e9223@192.168.1.1
[7]    CSeq: 1 INVITE
[8]    Max-Forwards: 70
[9]    Content-Type: application/sdp
[10]   Content-Length: 242
[11]
[12]   v=0
[13]   o=uana 3310748414 3310748414 IN IP4 192.168.1.1
[14]   s=SIP Call
[15]   c=IN IP4 192.168.1.1
[16]   t=0 0
[17]   m=audio 5004 RTP/AVP 8 0 4 15 2
[18]   a=rtpmap:8 PCMA/8000
[19]   a=rtpmap:0 PCMU/8000
[20]   a=rtpmap:4 G723/8000
[21]   a=rtpmap:15 G728/8000
[22]   a=rtpmap:2 G726-32/8000
```

Figure 6

```
[1]   SIP/2.0 200 OK
[2]   Via: SIP/2.0/UDP 192.168.1.1;branch=z9hG4bKc1e3619e0b12d5de
[3]   From: UAP A <sip:uap.a@example.org>;tag=fe9f0003c189627f
[4]   To: UAP B <sip:uap.b@example.org>;tag=7b9253363dbf0f51
[5]   Contact: <sip:uap.b@example.org>
[6]   Call-ID: a40c1f0d241e9223@192.168.1.1
[7]   CSeq: 1 INVITE
[8]   Max-Forwards: 70
[9]   Content-Type: application/sdp
[10]  Content-Length: 141
[11]
[12]  v=0
[13]  o=uanb 3310748415 3310748415 IN IP4 192.168.1.3
[14]  s=SIP Call
[15]  c=IN IP4 192.168.1.3
[16]  t=0 0
[17]  m=audio 5004 RTP/AVP 8
[18]  a=rtpmap:8 PCMA/8000
```

```
[1]     INVITE sip:uap.b@example.org SIP/2.0
[2]     Via: SIP/2.0/UDP 192.168.1.1;branch=z9hG4bKc1e3619e0b12d5de
[3]     From: UAP A <sip:uap.a@example.org>;tag=fe9f0003c189627f
[4]     To: UAP B <sip:uap.b@example.org>
[5]     Contact: <sip:uap.a@example.org>
[6]     Call-ID: a40c1f0d241e9223@192.168.1.1
[7]     CSeq: 1 INVITE
[8]     Max-Forwards: 70
[9]     Content-Type: application/sdp
[10]    Content-Length: 315
[11]
[12]    v=0
[13]    o=uapa 3310748414 3310748414 IN IP4 192.168.1.1
[14]    s=SIP Call
[15]    c=IN IP4 192.168.1.1
[16]    t=0 0
[17]    m=audio 5004 RTP/AVP 18 0 4 8 15 2
[18]    a=rtpmap:18 G729/8000
[19]    a=rtpmap:0 PCMU/8000
[20]    a=rtpmap:4 G723/8000
[21]    a=rtpmap:8 PCMA/8000
[22]    a=rtpmap:15 G728/8000
[23]    a=rtpmap:2 G726-32/8000
[24]    m=video 5006 RTP/AVP 32
[25]    a=rtpmap:32 MPV/9000
```

Figure 12

```
[1]   INVITE sip:uap.b@example.org SIP/2.0
[2]   Via: SIP/2.0/UDP mcs.example.org;branch=z9hG4bK016f5b74fadb1025
[3]   Via: SIP/2.0/UDP 192.168.1.1;branch=z9hG4bKc1e3619e0b12d5de
[4]   From: UAP A <sip:uap.a@example.org>;tag=fe9f0003c189627f
[5]   To: UAP B <sip:uap.b@example.org>
[6]   Contact: <sip:uap.a@example.org>
[7]   Call-ID: a40c1f0d241e9223@192.168.1.1
[8]   CSeq: 1 INVITE
[9]   Max-Forwards: 70
[10]  Record-Route: <sip:mcs.example.org;lr>
[11]  Content-Type: application/sdp
[12]  Content-Length: 213
[13]
[14]  v=0
[15]  o=uapa 3310748414 3310748414 IN IP4 192.168.1.1
[16]  s=SIP Call
[17]  c=IN IP4 192.168.1.1
[18]  t=0 0
[19]  m=audio 5004 RTP/AVP 18 15
[20]  a=rtpmap:18 G729/8000
[21]  a=rtpmap:15 G728/8000
[22]  m=video 0 RTP/AVP 32
[23]  a=rtpmap:32 MPV/9000
```

Figure 13

```
[1]   SIP/2.0 200 OK
[2]   Via: SIP/2.0/UDP mcs.example.org;branch=z9hG4bK016f5b74fadb1025
[3]   Via: SIP/2.0/UDP 192.168.1.1;branch=z9hG4bKc1e3619e0b12d5de
[4]   From: UAP A <sip:uap.a@example.org>;tag=fe9f0003c189627f
[5]   To: UAP B <sip:uap.b@example.org>;tag=7b9253363dbf0f51
[6]   Contact: <sip:uap.b@example.org>
[7]   Call-ID: a40c1f0d241e9223@192.168.1.1
[8]   CSeq: 1 INVITE
[9]   Max-Forwards: 70
[10]  Record-Route: <sip:mcs.example.org;lr>
[11]  Content-Type: application/sdp
[12]  Content-Length: 187
[13]
[14]  v=0
[15]  o=uapb 3310748415 3310748415 IN IP4 192.168.1.3
[16]  s=SIP Call
[17]  c=IN IP4 192.168.1.3
[18]  t=0 0
[19]  m=audio 5004 RTP/AVP 18
[20]  a=rtpmap:18 G729/8000
[21]  m=video 0 RTP/AVP 32
[22]  a=rtpmap:32 MPV/9000
```

Figure 14

METHOD AND SYSTEM FOR CONTROLLING MEDIA SESSIONS IN NETWORKS THAT USE COMMUNICATION PROTOCOLS WITH DISTINCT SIGNALING AND MEDIA CHANNELS

This application also includes subject matter that is protected by copyright. All rights are reserved.

BACKGROUND OF THE INVENTION

The present invention relates generally to real-time communications over Internet Protocol (IP) networks.

Several modern communication protocols use an "out-of-band signaling" mechanism whereby the channel used to control the communication (the "signaling" or "control" channel) is distinct from the channel used to carry the communicated information itself (the "bearer" or "media" channel). In such protocols, it is possible to control the behavior of the media channel indirectly by actively monitoring and, when necessary, modifying the information that flows in the control channel. Examples of such protocols include H.323, MGCP and the Session Initiation Protocol (SIP).

SIP is a signaling protocol that was created and is maintained within the framework of the Internet Engineering Task Force (IETF) standards development process. Currently, the document that defines the SIP standard is IETF "Request for Comments" (RFC) 3261. The primary purpose of SIP is to create, maintain and terminate interactive communication sessions between intelligent systems connected to an Internet Protocol (IP) network. In SIP terminology, these sessions are commonly referred to as "media" sessions.

When a SIP based system wishes to manage (e.g., initiate, modify or destroy) a media session (or sessions) with another SIP based system, it describes the media session(s) of interest using an IETF standard protocol called the Session Description Protocol (SDP). Currently, the document that defines the SDP standard is IETF "Request for Comments" (RFC) 2327. When SIP based systems negotiate media sessions, they embed SDP media descriptions within the SIP signaling messages they exchange. The media sessions themselves, however, are independent of the signaling sessions and can take different paths through the network.

Using SIP and SDP, intelligent systems are able to set up, maintain and terminate various kinds of media sessions including, for example, real-time text messaging, audio, video, bulk data transfer and interactive application sharing sessions. This enables users of SIP based systems and applications to engage in a wide range of multi-media communication and collaboration activities.

In today's networks, however, organizations often have a need to exercise administrative control over the kinds of media sessions that SIP based systems are allowed to set up, particularly at boundary points in the network. This requirement is derived from the need to provide adequate network security, to control costs, to prevent the unauthorized use of network resources, to ensure acceptable quality of service, and to enforce compliance with internal policies and external regulations.

In SIP based network environments, the need to exercise control over media sessions must sometimes be balanced against the need to ensure optimal performance for SIP based applications. SIP was designed to permit signaling and media traffic to take separate and independent paths through the network to increase the scalability of SIP signaling systems and optimize the performance of SIP-associated media sessions. As a consequence, it has not been possible in the past to effectively control media sessions while preserving the independence of the signaling and media streams in SIP/SDP based network environments. The present invention addresses this need in the art. Therefore, it is desirable to be able to control media sessions while preserving the independence of the signaling and media streams.

BRIEF SUMMARY OF THE INVENTION

It is a general object of the present invention to provide enhanced SIP/SDP based networking.

It is another general object of the invention to provide a method of and system for controlling media sessions while preserving the independence of the signaling and media streams in SIP/SDP based network environments.

It is a more specific object of the invention to provide such control by placing a media control system in the path of signaling, but not necessarily media information that is exchanged by SIP-compliant User Agents or Proxies (UAPs). The system enforces control policies on the UAPs by operating on and/or responding to the signaling messages that traverse it. The media control policies enforced by the control system typically allow certain types of media sessions to occur between UAPs while disallowing other types of media sessions. If the media control system in located in the path of both and signaling and media information, it enforces policies by operating on and/or responding to the signaling messages that traverse the system.

In certain network environments, the media control system of the present invention is located at a network boundary across which the UAPs generally may have no means of exchanging signaling information (other than through the control system). Such a constraint can easily be imposed, for example, by appropriate design of the physical network or by use of a network level filtering device such as a firewall. In this embodiment, the media control system enforces media control policies on any UAPs located on opposite sides of the network boundary. In other network environments, the UAPs are able to exchange signaling information with each other directly or via some network path other than through the media control system. In this alternate embodiment, preferably the media control system enforces media control policies only on UAPs that voluntarily elect to send signaling information through the control system. Generalizing, the present invention describes a system for controlling media sessions associated with SIP-compatible signaling sessions that traverse the system; the media control system does not concern itself with the reasons why or how certain signaling sessions might traverse the system and others might not.

In yet another embodiment, the present invention may be implemented in an environment in which SIP UAPs manage media sessions for systems other than themselves. Thus, the techniques of the present invention are applicable whether or not the SIP UAPs that negotiate the media sessions are themselves the endpoints of the associated media streams. The described system thus controls how a given media session may be allowed or prevented, irrespective of its endpoints.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 13 illustrates the message of FIG. 12 after the media control system modifies the audio and video media session descriptions in the SDP body of the INVITE message and updates the message headers; and FIG. 14 illustrates a response to the message of FIG. 13, accepting the proposed audio session.

DETAILED DESCRIPTION OF AN
ILLUSTRATIVE EMBODIMENT

The present invention is described below in the context of the Session Initiation Protocol (SIP), however, this is merely for illustrative purposes. The techniques described below may be implemented in any communication protocol that uses an "out-of-band signaling" mechanism whereby the channel used to control the communication (the "signaling" or "control" channel) is distinct from the channel used to carry the communicated information itself (the "bearer" or "media" channel).

As is well-known, some Internet applications require the creation and management of a session, which is a data exchange between given entities. Numerous protocols exist for carrying various forms of real-time multimedia session data such as voice, video, or text messages. The Session Initiation Protocol (SIP) works with these protocols by enabling Internet endpoints (called user agents) to discover one another and to agree on a characterization of a session they would like to share. SIP enables the creation of an infrastructure of network hosts (called proxy servers) to which user agents can send registrations, session invitations, and other requests. SIP creates, modifies, and terminates sessions and works independently of the underlying transport protocols. More specifically, the Session Initiation Protocol (SIP) is an application-layer control protocol that can establish, modify, and terminate multimedia sessions. The basic functions of SIP are: location of an end point, signal of a desire to communicate, negotiation of session parameters to establish a session, and teardown of the session once established. A representative example of a SIP message exchange occurs between two users A and B, each of which has a SIP application on his or her computing device. Each user may be associated with a SIP proxy server that can act on the user's behalf to facilitate the session establishment. According to RFC 3261, a proxy is an intermediary entity that acts as both a server and a client for the purpose of making requests on behalf of other clients. As described in RFC 3261, proxies are also useful for enforcing policy; for example, where the protocol is used to facilitate an Internet telephony call, one such policy would test to determine whether a given user at an Internet endpoint is allowed to make a call. A proxy interprets, and, if necessary, rewrites specific parts of a request message before forwarding it. A SIP request is a SIP message sent from a client to a server for the purpose of invoking a particular operation. A SIP response is a SIP message sent from a server to a client that indicates the status of a request sent from the client to the server. As noted above, a user agent (UA) is a logical entity that can act as both a user agent client and user agent server. A User Agent Client (UAC) is a logical entity that creates a new request, and then uses the client transaction state machinery to send it. A User Agent Server (UAS) is a logical entity that generates a response to a SIP request. The response accepts, rejects, or redirects the request.

SIP-compliant devices communicate using an HTTP-like request/response transaction model. Each transaction consists of a request that invokes a particular method, or function, on the server, and at least one response. For example, a transaction begins with A's device sending an INVITE request addressed to B's SIP identifier. INVITE is an example of a SIP method that specifies the action that the requestor A wants the server B to take. The INVITE request contains a number of header fields, which are named attributes that provide additional information about a message. Thus, for example, an INVITE includes a unique identifier for the call, the destination address, A's address, and information about the type of session that A desires to establish with B. The details of the session, such as the type of media, codec, or sampling rate, are not described using SIP. Rather, the body of a SIP message contains a description of the session, typically encoded in some other protocol format. One such format is the Session Description Protocol (SDP).

Figure 1:
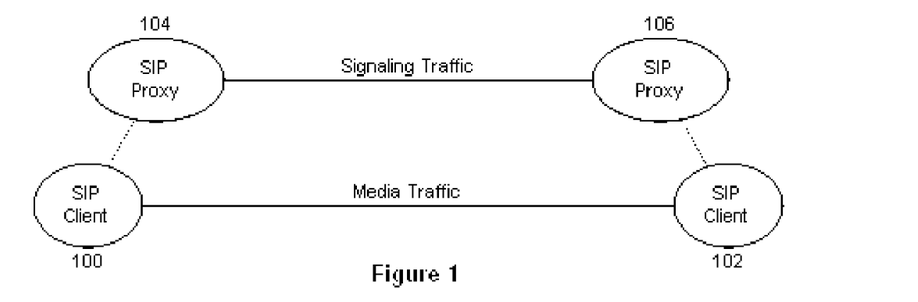
FIG. 1 illustrates a conventional SIP architecture as is known in the prior art.

The Session Initiation Protocol was designed to enable the "signaling" (control) and "media" (content) traffic to follow completely separate physical paths through a network. In a typical SIP call, the signaling traffic flows from one SIP client (an endpoint) to another SIP endpoint, typically through a series of "signaling proxies" and the media traffic flows from one endpoint to the other endpoint directly. This concept is illustrated in FIG. 1 for a pair of SIP endpoints 100 and 102, and a set of signaling proxies 104 and 106. This approach enables the SIP proxies 104 and 106 to handle a large amount of signaling traffic, as they do not have to handle any associated media traffic.

Figure 2A:
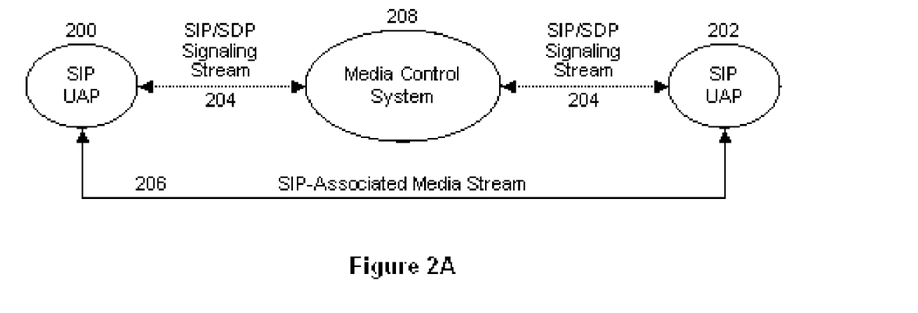
FIG. 2A illustrates a first embodiment of the present invention wherein a media control system (MCS) of the present invention is located within just a signaling path between SIP conformant User Agents and/or Proxies.

With the above as background, FIG. 2A illustrates the basic concept of the present invention. In this figure, it is assumed that there are a pair of SIP-compliant entities (e.g., User Agents or Proxies) 200 and 202 that transfer signaling information over a signaling path 204, and that transfer associated media stream information over a media path 206. According to the invention, a media control system (MCS) 208 is positioned in or in association with the signaling path for the purpose of enforcing one or more control policies. In particular, the MCS 208 enforces control policy on the UAPs (or other SIP-compliant entities) by operating on and/or responding to the signaling messages that traverse the MCS. As will be seen in more detail below, the media control policies enforced by the control system 208 typically allow certain types of media sessions to occur between UAPs, while disallowing other types of media sessions.

Generalizing, a "policy" is a set of more or less general rules that determine the specific behavior of a computer based-system under a given set of real-time circumstances. Conceptually, a policy is a set of "rules," where each rule consists of a "condition" and a set of one or more "actions." A condition typically is a logical (Boolean) expression that can be evaluated to a value of either true or false by the system, preferably in real-time. An action is a concrete response to be taken by the system if the associated condition is true. In a given embodiment, and as will be seen by example below, the media control system (MCS) enforces an applicable policy in response to a real-time event by executing the action or actions associated with each rule in the policy whose condition component "matches" (i.e., evaluates "true"). In an illustrative embodiment, the MCS is implemented in software executing on an operating system such as Linux running on commodity (e.g., Intel-based) hardware. Any suitable hardware and operating system may be used for this purpose.

As illustrated in FIG. 2A, the MCS is located within the signaling path 204 and is separate and distinct from the media path 206. This is a preferred embodiment, but it is not a limitation of the invention. Where the signaling and media paths converge, and where the media control system 208 is located (physically or logically) in both, the media control system enforces policies by operating on and/or responding to just the signaling messages that traverse it.

In certain network environments, the MCS 208 of the present invention is located at a network boundary across which the UAPs generally may have no means of exchanging signaling information (other than through the control system). Such a constraint can easily be imposed, for example, by placing the control system within or adjacent to a network level filtering device, such as a firewall. In such an embodiment, the MCS of the present invention enforces media control policies on any UAPs located on opposite sides of the network boundary. In other network environments, the UAPs are able to exchange signaling information with each other directly or via some network path other than through the media control system. In this alternate embodiment, preferably the MCS enforces media control policies only on UAPs that voluntarily elect to send signaling information through the control system. Generalizing, the present invention describes a system for controlling media sessions associated with SIP-compatible signaling sessions that traverse the system; the media control system does not concern itself with the reasons why certain signaling sessions might traverse the system and others might not.

Figure 2B:
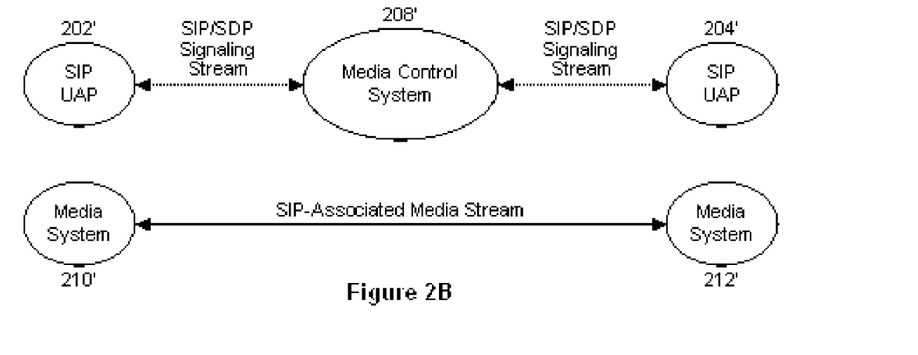
FIG. 2B illustrates the media control system (MCS) of FIG. 2A managing media sessions for systems other than the SIP UAPs that are themselves the endpoints of the associated media stream.

In yet another embodiment as illustrated in FIG. 2B, the MCS 208' is implemented in an environment in which SIP UAPs 202' and 204' manage media sessions for systems (e.g., 210' and 212') other than themselves. Thus, the techniques of the present invention are applicable whether or not the SIP UAPs that negotiate the media sessions are themselves the endpoints of the associated media streams. Stated more generally, the described media control system thus controls how a given media session may be allowed or prevented, irrespective of its endpoints.

Figure 3:
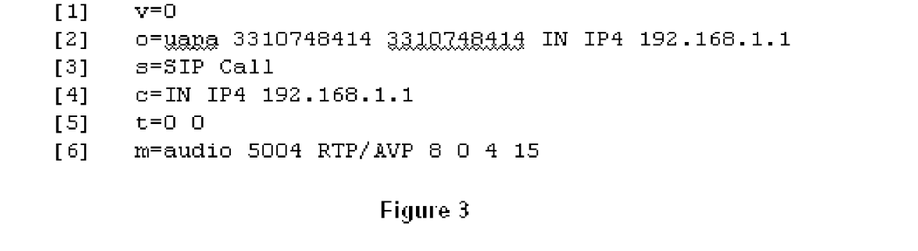
FIG. 3 illustrates a known SDP session description.

The following provides additional details regarding the operation of the MCS. By way of brief background, FIG. 3 illustrates a typical SDP session description. The line numbers in brackets have been added for reference purposes only. For the purposes of the present discussion, the element of interest in the session description is line 6 (m=audio 5004 RTP/AVP 8 0 4 15), which represents a "media description" or "media announcement." This line describes the media session that is being negotiated. It has a format that is defined as follows:

m=<media> <port> <transport> <format-list>.

Figure 4:
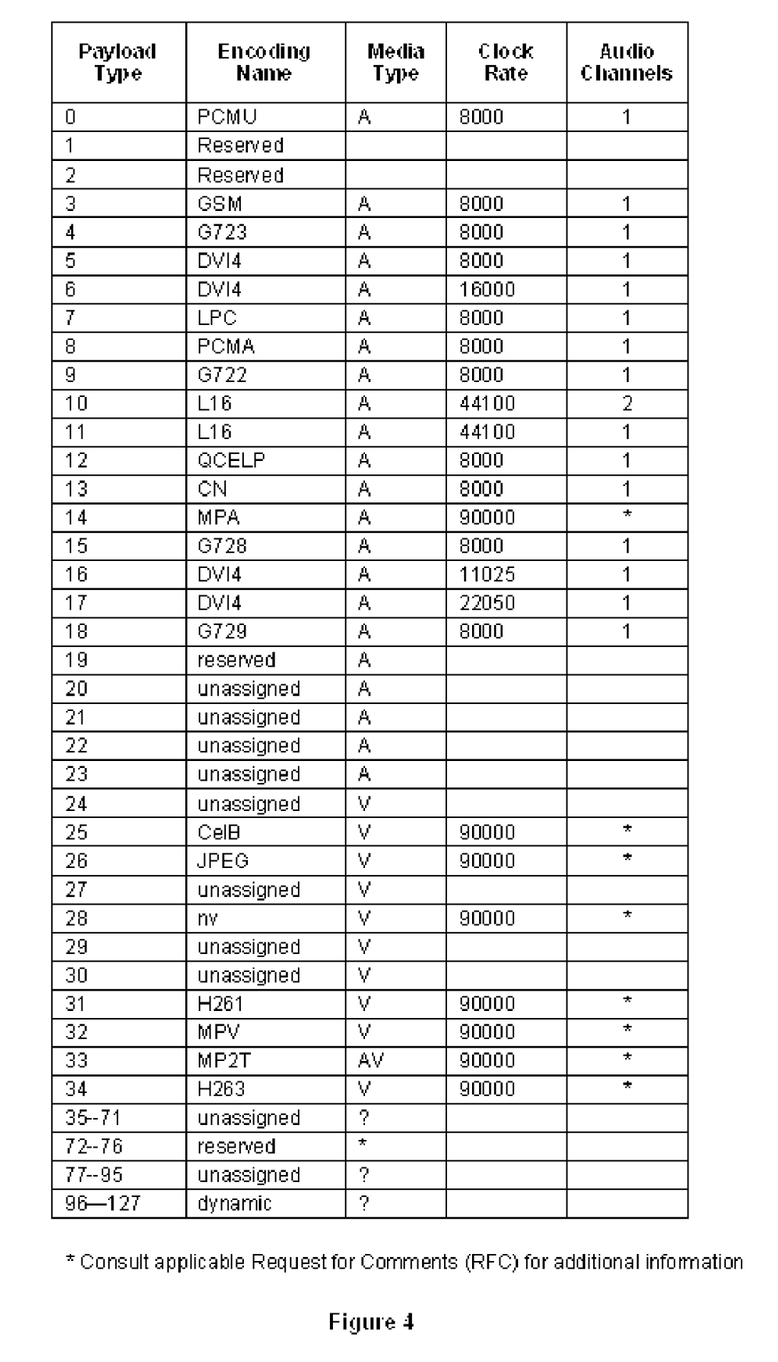
FIG. 4 is a look-up table in which media session format attributes can be derived as is known in the art.

The "media" parameter describes the media type. Defined values for the media parameter are, for example: "audio", "video", "application", "data", "telephone-event" and "control." The "port" parameter is a numerical value indicating a logical transport protocol port for the media session. The "transport" parameter is the media session's transport protocol. Defined values for the transport parameter are, for example: "RTP/AVP", "vat", "rtp", "UDPTL" and "TCP." The "format-list" parameter is a list of numeric media payload type options for the media session. If no additional information regarding the attributes of the listed media payload type options is included in the media description, then the media format attributes can be derived from the numerical payload type value using a static look-up table such as illustrated in FIG. 4. Thus, for example, if an SDP media description includes a reference to a media session with a media format option, for example, of RTP/AVP payload type "8"- without providing additional information that explicitly specifies the attributes of the media format—the media description is referring to a media session with an encoding type of PCMA, a clock rate of 8000 and one (1) audio channel. This is sometimes expressed in shorthand notation as a media format of "PCMA/8000/1" (<encoding type>/<clock rate>/[<audio channels>]).

With regard to the illustrative media description of FIG. 3, then ("m=audio 5004 RTP/AVP 8 0 4 15"), the description is referring to an RTP/AVP audio session with four (4) media format options: PCMA/8000/1 (payload type 8), PCMU/8000/1 (payload type 0), G723/8000/1 (payload type 4) and G728/8000/1 (payload type 15).

Figure 5:
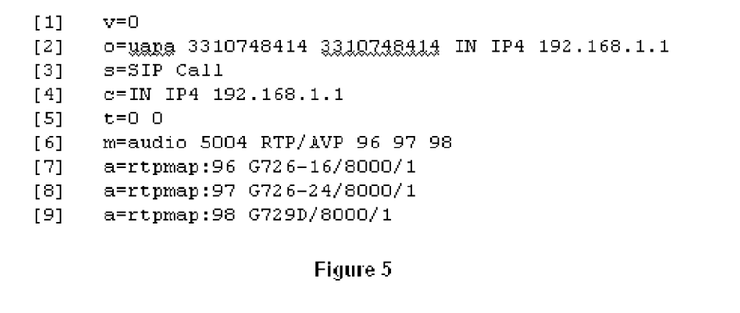
FIG. 5 is an illustrative media session description with media attributes.

In addition to media description statements, SDP messages can include "media attribute" statements that provide additional information about the media session that is being described. For example, session descriptions can include media attributes that reproduce, extend or override the default or "static" media format attributes shown in the table of FIG. 4. A session description with media attributes is shown in FIG. 5. In this example, the media description in line 6 is followed by three media attributes (lines 7, 8, 9) that modify it. Specifically, the media description on line 6 refers to three payload format options using "dynamic" RTP/AVP payload types 96, 97 and 98. The media attribute statements in lines 7-9 define the media formats to be associated with (or "mapped to") those payload types. For example, the media attribute on line 7 maps RTP/AVP payload type 96 to a media format with an encoding name of "G726-16", a clock rate of 8000 and one audio channel.

According to the present invention, media control system (MCS) enforces media control policies, preferably by inspecting, interpreting and potentially modifying or destroying the media descriptions and attributes embedded in the SDP bodies of SIP signaling messages that traverse it. Generally, and as noted above, a media control policy is a rule that specifies a particular action to be taken with respect to a given media session. One or more rules may comprise a policy, or each policy may have its own rule. For example, one could define a media control policy such as "Allow audio sessions with encoding formats of PCMA, PCMU and G729; block all other media sessions." Media policies can be either direct or indirect. Where direct, the policy is based on information included explicitly in the SDP message bodies. Where indirect, the policy is based on information that can be derived from information in the SDP messages. For example, the MCS could enforce a policy such as "Allow audio sessions with a nominal bandwidth consumption of 32 kilobits per second or less; block all other audio sessions" provided the MCS has knowledge of the bandwidth requirements of the various media formats. Of course, the above is merely representative.

As described above, SIP based systems negotiate media sessions using a technique known as the "SDP offer/answer mechanism." Using this technique, one SIP user agent proposes a media session (or sessions) to another user agent by embedding an "SDP offer" into a SIP signaling message. The SDP offer contains a set of proposed media connections, each of which includes a set of connection parameters (such as media type, port number and transport protocol) and a list of possible connection formats (a selection of media payload types, for example). Using this mechanism, a SIP user agent can offer a variety of types of media connections such as audio, video, application and data connections.

Figure 6:
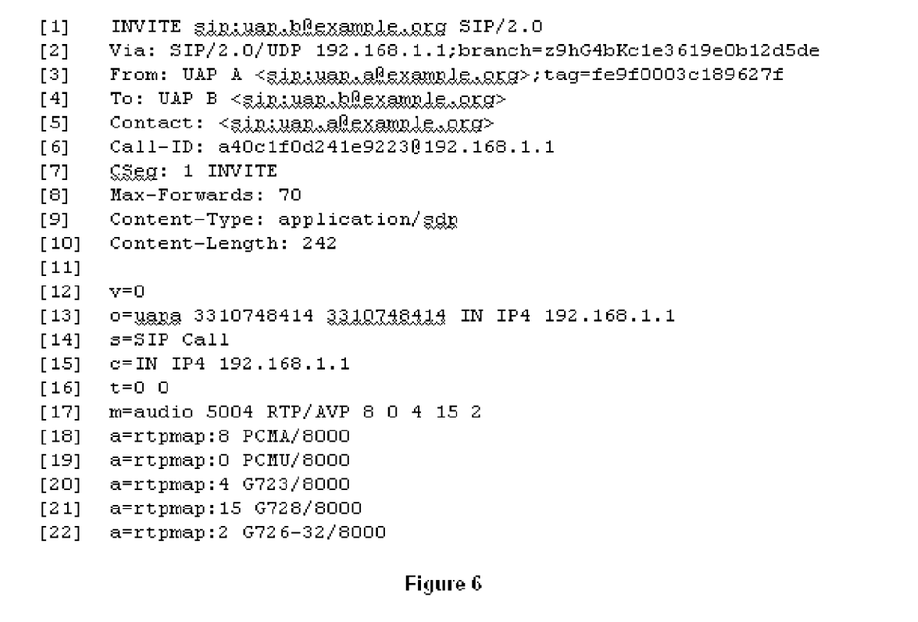
FIG. 6 is an illustrative SDP offer embedded in a SIP INVITE message.
Figure 7:
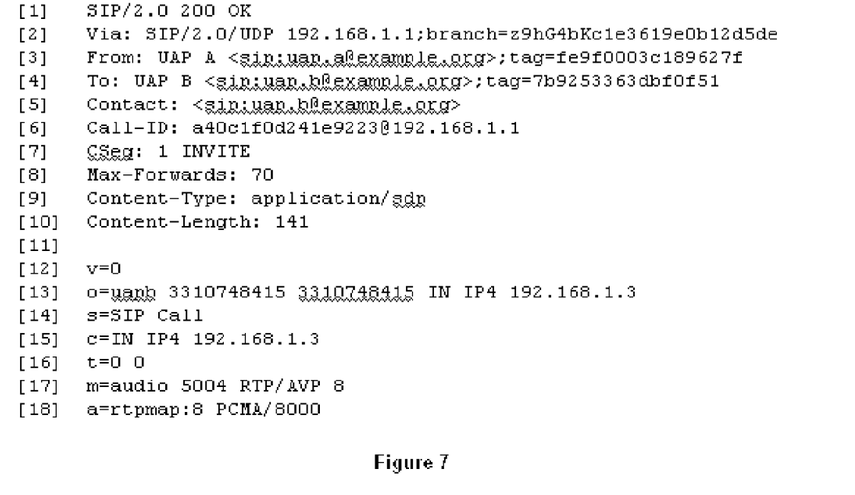
FIG. 7 is an illustrative SDP answer to the SDP offer of FIG. 6 embedded in a SIP "200 OK" response.

FIG. 6 shows an example of a simple SDP offer embedded in a SIP INVITE message. As described above, line numbers in brackets have been inserted for reference purposes. The SDP offer is contained in lines 12 through 22. The user agent is offering an audio session with five payload type (codec) options (line 17). Additional descriptive information for each of the media type options is included in media attributes (lines 18 through 22). After receiving the SDP offer and potentially exchanging one or more non-SDP signaling messages with the calling user agent, the called user agent responds to the SDP offer by sending back an SDP answer embedded in a SIP "200 OK" response to the calling user agent's INVITE request. Details of the response message are shown in FIG. 7. The SDP answer is contained in lines 12 through 18. The called user agent has accepted the proposed audio connection and selected audio/video profile 8 (PCMA/8000) as the media payload type option.

After the calling user agent acknowledges receipt of the SDP answer, the user agents can initiate the negotiated media session. In the above example, the SDP offer was embedded in a SIP request message. In general, SDP offers can be embedded either in SIP request messages (such as INVITE or UPDATE requests, for example) or in certain SIP response messages (in a "200 OK" response to a SIP INVITE request, for example). These two general cases are discussed below using signaling interaction diagrams. Note that the signaling interactions have been simplified for purposes of illustration. In particular, signaling messages that are not pertinent to the SDP offer/exchange mechanism are not shown.

Figure 8:
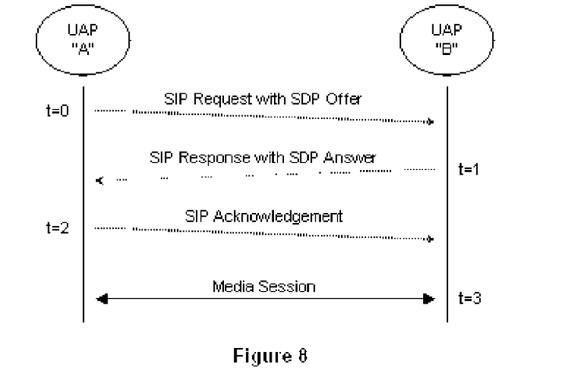
FIG. 8 illustrates the signaling interaction between a pair of UAPs with the SDP offer embedded in a SIP request message.

In the most typical case, the SDP offer is embedded in a SIP request message, as shown in FIG. 8. In this case, UAP A sends a SIP request containing an SDP offer to UAP B at time t=0. UAP B responds by sending a SIP response message containing an SDP answer to UAP A at time t=1. Assuming the SDP answer is acceptable to UAP A, UAP A will acknowledge it (time t=2) and the UAPs will set up the agreed upon media session (time t=3).

Figure 9:
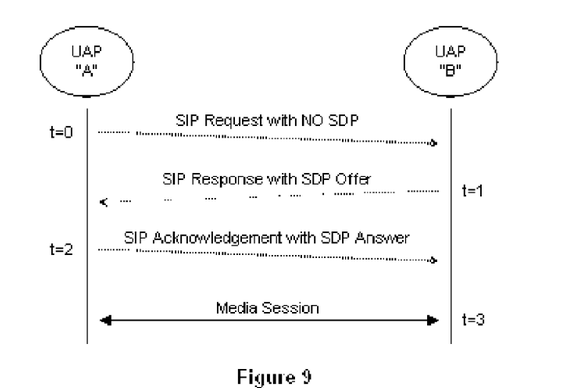
FIG. 9 illustrates the signaling interaction between a pair of UAPs with the SDP offer embedded in a SIP response message.

In the less typical case, the SDP offer is embedded in a SIP response message, as shown in FIG. 9. In this case, UAP A sends a SIP request that contains no SDP offer to UAP B at time t=0. UAP B responds by sending a SIP response message containing an SDP offer to UAP A at time t=1. UAP A sends a SIP acknowledgement message containing a valid SDP answer to UAP B (time t=2). Assuming the SDP answer is acceptable to UAP A, the UAPs will set up the agreed upon media session (time t=3).

The media control system (MCS) controls media sessions between SIP user agents or proxies (UAPs) by inserting itself into the SIP signaling path between the UAPs and participating actively in the SDP offer/exchange mechanism that occurs between them. The media control system preferably exposes a user interface (UI) through which an administrator may set a given policy. Any convenient UI (CLI, GUI, or the like) may be used for this purpose; alternatively, the media control system may have an associated application programming interface (API) through which configuration or other control commands are entered programmatically (by an external application, process, device or system) to establish a given policy. The media control system could also obtain its policies from an external policy server using a policy exchange protocol. More generally, the one or more policies are set from any given policy definition point. Once a given policy has been set, the MCS executes in a "runtime" mode. In particular, the MCS inspects some or all SDP offers that attempt to traverse it, and it selectively modifies them (as necessary) to ensure that they comply with the media control policies that have been defined, e.g., by the MCS administrator or other authorized entity.

The MCS enforces media control policies by inspecting, interpreting, potentially modifying and forwarding or discarding SIP messages that contain SDP offers. To determine whether an SDP body embedded in a SIP message is an SDP offer or an SDP answer, the MCS may consider the state of the "transaction" (a request/response message exchange) and/or a "dialog" (a sequence of related transactions) in which the message occurs. For example, to determine whether an SDP body contained in a "200 OK" response to a SIP INVITE message is an offer or an answer, the MCS must know whether the INVITE message contained an SDP offer. If the INVITE message contained an SDP offer, then the SDP body embedded in the "200 OK" response message is an SDP answer. If, on the other hand, the INVITE message did not contain an SDP offer, then the SDP body embedded in the "200 OK" response message is an SDP offer. To accomplish its enforcement tasks, the MCS may elect to store information within its own memory about the state of the transactions and/or dialogs that traverse it, or the MCS may use other means to retain state information, such as embedding state information in the messages that traverse it. The present invention does not concern itself with the means by which the system identifies SDP offers embedded in SIP signaling messages or distinguishes such offers from SDP answers.

There are several techniques that the MCS can use to control media behavior by operating on and/or reacting to the SDP offers that traverse it.

For example, if the MCS receives a SIP message with an SDP offer that contains a media description (or descriptions) proposing a media session (or sessions) which, per applicable media control policies, should be blocked, it can set the "port" parameter of such media description(s) to a value of "0", update the message headers as necessary and forward the message using standard SIP proxy forwarding techniques. In accordance with IETF RFC 3264, a SIP user agent that receives an SDP offer containing a media description with a "port" parameter of "0" will treat such a media offer as a session that has been offered but MUST NOT be used, and will decline the offered session in its SDP answer. Thus, the media session will have been prevented, in accordance with the media control policy. Note that, even if the SIP user agent that received the modified SDP offer wanted to accept the proposed session (in violation of RFC 3264), it could not do so because it would not know the value of the "port" parameter contained in the original (un-modified) SDP offer and thus would have no means of constructing a valid SDP answer accepting the proposed session.

The MCS can also enforce media control policies by modifying the media description's "format list" parameter and/or "media attribute" lines. If, for example, the MCS receives a media description with a format list that proposes several media payload type options, some of which are allowed by the applicable media control policies and some of which are not, it can remove the disallowed payload option values from the format list and delete the corresponding media attribute lines (if present); update the message headers as necessary; and forward the message using standard SIP proxy forwarding techniques. A SIP user agent that receives a SIP message containing an SDP offer that has been modified in this manner will not be aware that the disallowed media options had even been offered and therefore will have no means of accepting them. If none of the media format options in a particular media description are allowed, the MCS can set the media description's "port" parameter to "0" as discussed above, thereby blocking the entire media session.

If the MCS receives a SIP message with an SDP offer containing one or more media descriptions, all of which are disallowed by applicable media control policies, it can block them by setting all of their "port" parameters to "0" as described above or, alternatively, it can "drop" (fail to forward) the message and generate an appropriate error and/or session termination responses to the communicating user agents. If the SDP offer is contained in a SIP request message (such as an INVITE request, for example), the MCS can generate an appropriate error response (such as "304 Media type not available", "305 Incompatible media format" or "488 Not acceptable here", for example) to the requesting user agent (the UAC). If the SDP offer is contained in a SIP response message (such as a "200 OK" response to an INVITE request, for example), the MCS can generate an error message to the UAC as described above, send an acknowledgement (ACK) message containing an SDP answer with no accepted media sessions to the responding user agent (the UAS), and then send a session termination message (such as a BYE request) to the UAS.

Thus, in an illustrative embodiment, when the MCS receives a message that contains no SDP message body at all, an SDP answer message body, or an SDP offer whose media session descriptions all comply with applicable media control policies, it simply forwards the message to its destination using standard SIP proxy forwarding techniques. In contrast, when the MCS receives a message that contains an SDP offer with a mixture of compliant and non-compliant media session descriptions, preferably it modifies the non-compliant media session descriptions (for example, by setting the port parameter of the media description to "0" and/or editing the media format list and media attributes); updates the message headers as necessary; and then forwards the message using standard SIP proxy forwarding techniques.

When the MCS receives a message that contains an SDP offer whose media session descriptions are all non-compliant, preferably it either modifies the media session descriptions as described above or drops the message and generates error and/or session termination messages to the UAPs as appropriate. As a consequence, the UAPs are able to set up only media sessions that are in compliance with the media control policies.

Figure 10:
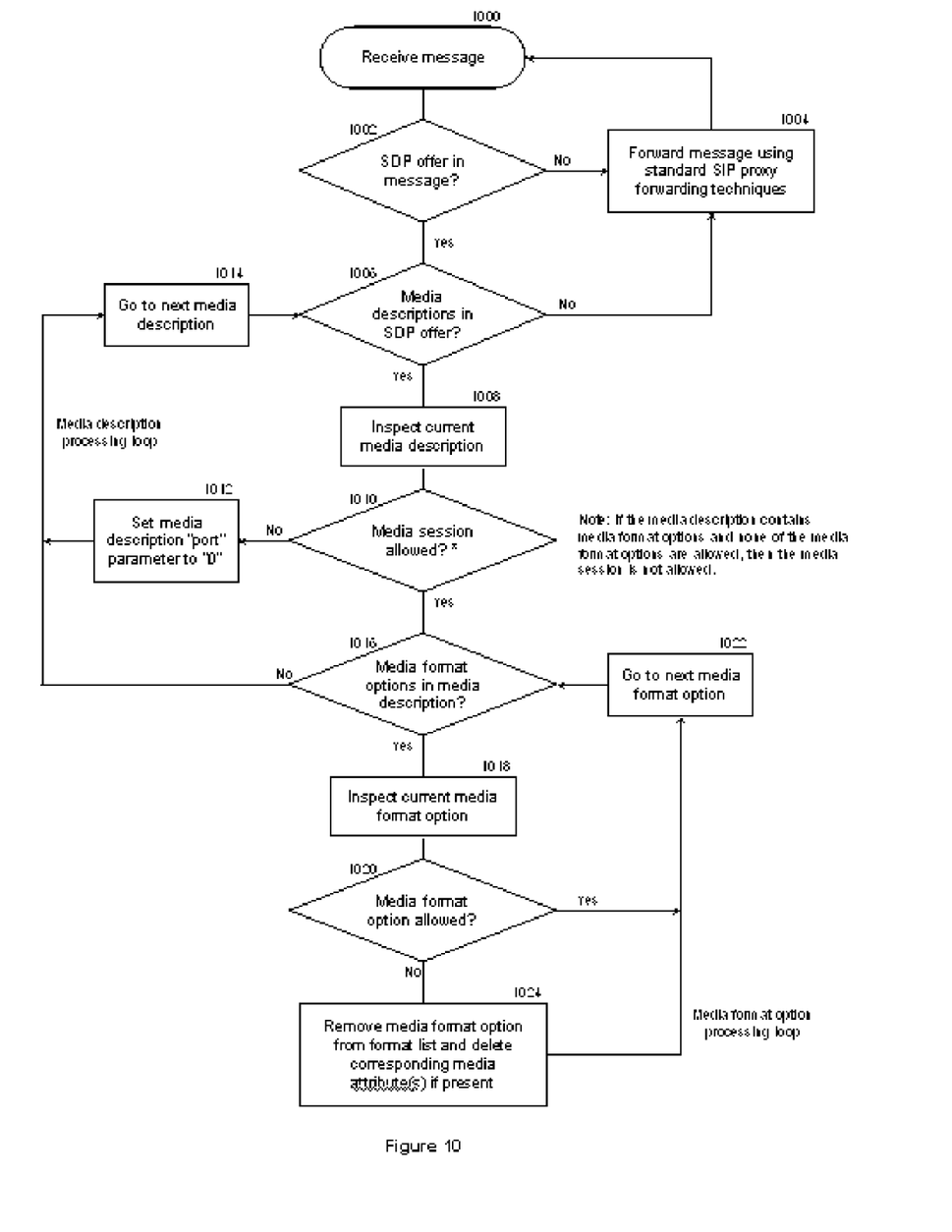
FIG. 10 is a process flow diagram illustrating a representative embodiment of a media control algorithm implemented by the media control system of the present invention.

FIG. 10 illustrates a process flow diagram of this high level media control algorithm. The routine assumes that SIP compliant entities have established the communication link in the usual manner, in accordance with the protocol, and that the MCS is intercepting messages.

The routine begins at step 1000 when the MCS receives a message. At step 1002, a test is performed to determine if the message contains an SDP offer. If the outcome of step 1002 is negative, the routine branches to step 1004 to forward the message using standard SIP proxy forwarding techniques and then continues to step 1000 to wait for the next message.

If, however, the outcome of the test at step 1002 is positive (the message contains an SDP offer), the routine branches to step 1006, where a test is performed to determine if the SDP offer contains media descriptions.

If the outcome of the test at step 1006 is negative (the SDP offer contains no media descriptions), the routine branches to step 1004 to forward the message using standard SIP proxy forwarding techniques and then continues to step 1000 to wait for the next message.

If, however, the outcome of the test at step 1006 is positive (the SDP offer contains media descriptions), the routine enters the media description processing loop by branching to step 1008 to inspect the first media description, and then continues to step 1010, where a test is performed to determine if the media session proposed in the media description is allowed by applicable media control policies. (Note that, in one illustrative embodiment, if the media description contains media format options and none of the media format options are allowed by applicable media control policies, then the entire media description is considered disallowed and the outcome of the test at step 1010 is negative).

If the outcome of the test at step 1010 is negative (the media session is not allowed), the routine branches to step 1012 to set the "port" parameter of the media description to "0", continues on to step 1014 to advance to the next media description, if present, and continues on to step 1006, where a test is performed to determine of there are any more media descriptions left in the message. If the outcome of the test at step 1006 is positive, the routine re-enters the media processing loop and continues the loop until all media descriptions in the SDP offer have been processed.

If, however, the outcome of the test at step 1010 is positive (the media session is allowed by applicable media control policies), the routine branches to step 1016, where a test is performed to determine if the media description contains media format options. If the outcome of the test at step 1016 is negative (the media description contains no media format options), the routine branches to step 1014 and advances to the next media description, if present.

If, however, the outcome of the test at step 1016 is positive (the media description contains media format options), the routine enters the media format option processing loop by branching to step 1018 to inspect the first media format option and then continues on to step 1020, where a test is performed to determine if the media format option is allowed by applicable media control policies.

If the outcome of the test at step 1020 is positive (the media format option is allowed), the routine branches to step 1022 to advance to the next media format option, if present, and continues to step 1016 where a test is performed to determine if there are any more media format options in the current media description. If the outcome of the test at step 1016 is positive (there are more media format options in the current media description), the routine re-enters the media format option processing loop, which is continues until all media format options in the current media description have been processed.

If, however, the outcome of the test at step 1020 is negative (the media format option is not allowed by applicable media control policies), the routine branches to step 1024 to remove the media format option from the media description and delete the corresponding media attribute(s), if present, and continues on to step 1022 to advance to the next media format option in the current media description.

When executed in an embodiment of the MCS, the routine described above will block unacceptable media sessions by removing disallowed media format options or setting the "port" parameter of media descriptions to "0", updating the appropriate SIP message headers as necessary and forwarding the modified message on to its destination using standard SIP proxy forwarding techniques. This would be the behavior even in the case where none of the media sessions proposed in a given SDP offer were allowed by applicable media control policies. As an alternative implementation, the algorithm could detect this specific case and, rather than forwarding a message with no acceptable media offers, could instead "drop" (fail to forward) the message and generate error and/or session termination messages to the user agents as appropriate. In the case where an SDP offer with no acceptable media sessions was embedded in a SIP request (such as an INVITE request, for example), the MCS could generate, for example, a "304 media type not available," "305 incompatible media format" or "488 not acceptable here" error response to the requestor. In the case where an SDP offer with no acceptable media sessions was embedded in a SIP response (such as a "200 OK" response to an INVITE with no SDP offer, for example), the MCS could generate an appropriate error response to the requestor (user agent client) as discussed above; send an acknowledgement (ACK) request containing a valid SDP answer with all media sessions declined to the responder (user agent server); and send a session termination request (e.g. a BYE) to the responder (the user agent server).

Figure 11:
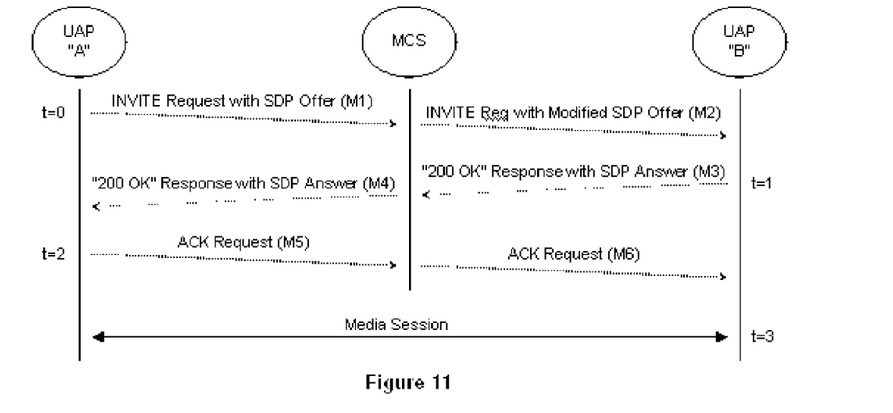
FIG. 11 illustrates an embodiment of the present invention with the media control system (MCS) configured with a given media control policy.
Figure 12:
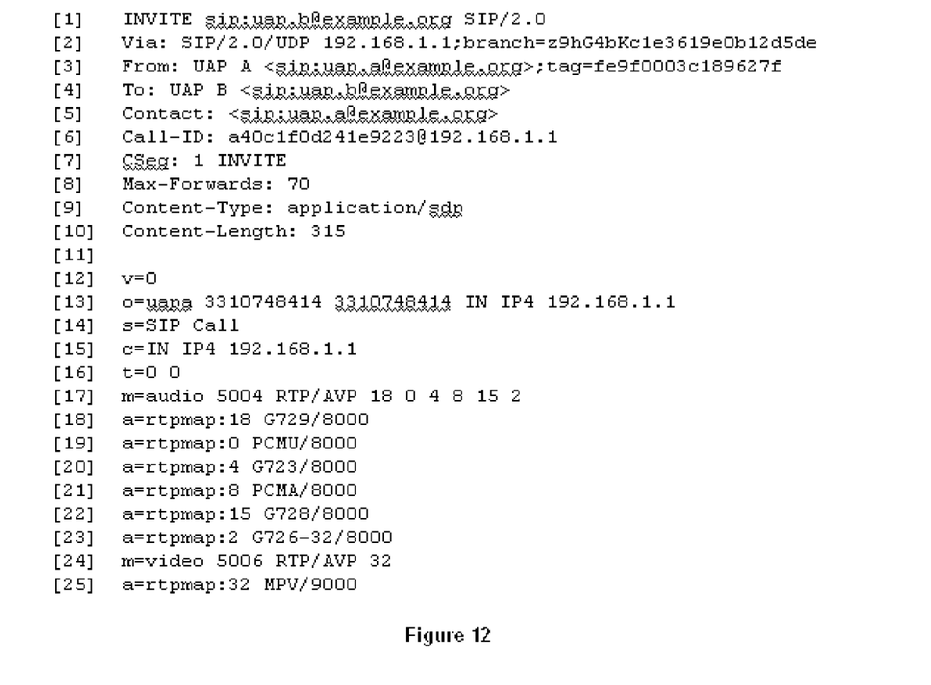
FIG. 12 is an illustrative INVITE message containing an SDP offer proposing an audio session and a video session.

In the following paragraphs, a detailed example is provided of a signaling interaction involving the MCS. This operation is merely representative of the general operating principles. Simplified signaling diagrams and SIP messages are used to illustrate the interaction. SIP signaling messages that are not central to the media control functionality of the MCS have been removed from the diagrams to facilitate the discussion. In the example scenario, the MCS is located between two SIP user agents or proxies that wish to initiate media sessions. The MCS has been configured with the following media control policy: "Allow audio sessions with G728 or G729 media formats; block all other sessions." The signaling interaction is shown in FIG. 11. At time t=0, UAP A sends a SIP INVITE request message (M1) to UAP B via the MCS. In this example, the message contains an SDP offer proposing an audio session with several media format options and a video session, as seen in lines 17 through 23 and 24 through 25 of FIG. 12. The MCS receives message M1, inspects it and recognizes that four of the format options in the proposed audio session and the proposed video session are disallowed by the configured media control policy. Thus, and in accordance with the algorithm described in FIG. 10, the MCS removes the disallowed payload type values (0, 4, 8, and 2) from the format list of the media description (line 17 of FIG. 12); deletes the corresponding media attributes (lines 19, 20, 21 and 23 of FIG. 12); sets the "port" parameter of the video session description (line 24 of FIG. 12) to a value of "0"; updates the message headers as necessary and forwards the modified message (M2) to UAP B.

Message M2 is shown below in FIG. 13. Note that the disallowed media format options and attributes have been removed from the media description of the audio session (lines 19 through 21), and the media description for the video session (line 22) has had its "port" parameter set to "0".

At time t=1, UAP B responds to the INVITE request (M2), e.g., by sending a "200 OK" response message (M3) to UAP A via the MCS. A seen in the SDP answer of message M3 (FIG. 14), UAP B has accepted the proposed G729 format audio session (lines 19 and 20 of FIG. 14) and has declined the proposed video session (lines 21 and 22 of FIG. 14). The MCS receives message M3 from UAP B and forwards it to UAP "A" using standard SIP proxy routing techniques (message M4). At time t=2, UAP A sends a SIP acknowledgement (ACK) message to UAP B (messages M5 and M6). The UAPs then set up the negotiated audio session.

The above example demonstrates the basic mechanism by which the MCS enforces media control policies on the SIP sessions that traverse it. Using this basic mechanism, the MCS can enforce a rich variety of media control policies including, for example, policies such as the following: Allow only sessions with media type of 'audio' or 'Video'; Deny all sessions with media types of 'application' or 'data'; Allow only sessions with media type 'message' and transport type 'msrp'; Allow only sessions with transport type 'RTP/AVP'; Allow only audio sessions; Allow only sessions with clock rates less than or equal to 8,000; Allow only sessions with encoding names 'G722', 'G728', 'G729'; Allow only sessions with maximum bandwidth consumption of 32 kbps or less; Allow only sessions with statically defined RTP/AVP payload types.

The present invention has numerous advantages over the prior art. The media control system (MCS) enforces media control policies on systems that conform to the relevant protocol specifications (such as SIP and SDP), preferably by interpreting and potentially modifying the SDP offers embedded in the SIP signaling messages that traverse it. This enables the MCS to exercise control over SIP-associated media sessions without necessarily inserting itself into the media streams themselves. The MCS can enforce media control policies that are based either directly on information that is explicitly contained in SDP message bodies or on secondary information that can be derived from information that is contained in the SDP messages. More generally, the media control system enables an enterprise to securely deploy real-time SIP-based applications, e.g., by providing a single point of policy-driven security, control, and monitoring required to bring these applications into compliance with internal security policies and external regulations.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs on a server on a standard Intel hardware platform running an operating system such as Linux.

While given components of the system have been described separately, one of ordinary skill will appreciate that some of the functions may be combined or shared in given instructions, program sequences, code portions, and the like.

Further, although protocols like SIP and SDP evolve over time and the governing standards documents that define them are updated from time to time, such evolution and updating are not material to the present invention. One of ordinary skill in the art will appreciate that the present invention is based on the fundamental principles of the SIP and SDP protocols, and is not dependent on any particular version of the relevant standards documents.

Finally, the techniques of the present invention, wherein a media controller monitors traffic in the signaling (but not necessarily the media) path and takes a given action based on a given policy is not limited to SIP, or SIP as implemented using SDP.

Having described our invention, what we now claim is as follows.

What is claimed is:

1. A machine-implemented method operative within a signaling path between given entities that are attempting to set up a media session via transfer of signaling messages that conform to the Session Description Protocol (SDP), wherein the given entities are compliant with the Session Initiation Protocol (SIP) comprising:
   receiving a media control policy that includes at least one rule, the rule specifying a particular action to be taken with respect to a media session as a function of a condition stated in the rule, where the condition is ascertainable from information in a media description of a signaling message;
   monitoring the signaling path for a given signaling message;
   evaluating the media description in the given signaling message against the condition stated in the rule of the media control policy;
   if the condition stated in the rule of the media control policy is met, altering the media description within the given signaling message to conform to the media control policy to generate an updated signaling message; and
   forwarding the updated signaling message,
   wherein the altering comprises:
     (a) responsive to the media description containing one or more media format options with none of the one or more media format options allowed by the condition, setting a given parameter of the media description to a given value that indicates that the media session has been offered and cannot be accepted; and
     (b) responsive to the media description containing one or more media format options with any of the one or more media format options allowed by the condition,
   removing those media options that are not allowed by the condition stated in the rule.

2. The method as described in claim 1 wherein the given signaling message is an SDP offer embedded in a SIP request message, or an SDP offer embedded in a SIP response message.

3. The method as described in claim 1 wherein the SIP-compliant entities are attempting to set up a media session on their own behalf, or on behalf of one or more entities.

4. The method as described in claim 1 further including the step of altering a second media description in the given signaling message to conform to the media control policy.

5. The method as described in claim 1 wherein the signaling path is monitored external to a media path.

6. The method as described in claim 1 wherein the media control policy evaluates the media description explicitly or implicitly.

7. The method as described in claim 1 wherein the altering further comprises:
   responsive to the media description contains one or more media format options with any of the one or more media options are allowed by the condition stated in the rule of the media control policy, removing those media options that are not allowed by the condition stated in the rule and also removing media attributes corresponding to those media options that are not allowed by the condition stated in the rule.

8. The method as described in claim 1 wherein (a) is performed before (b).

9. The method as described in claim 1 wherein the setting further comprises setting a "port" parameter of the media description to a zero value to indicate that the media session has been offered and cannot be accepted.

10. A machine-implemented method operative within a signaling path between given entities that are attempting to set up a media session via transfer of signaling messages that conform to the Session Description Protocol (SDP), wherein the given entities are compliant with the Session Initiation Protocol (SIP), comprising:
   (a) receiving a media control policy that includes at least one rule, the rule specifying a particular action to be taken with respect to a media session as a function of a condition stated in the rule, where the condition is ascertainable from information in a media description of a signaling message;
   (b) monitoring the signaling path for a given signaling message;
   (c) upon receipt of a given SDP signaling message:
     (i) determining whether any media description within the given signalling message is compliant or is non-compliant with the media control policy by evaluating each media description against the condition stated in the rule of the media control policy; and
     (ii) if any media description is non-compliant with the media control policy, modifying media description for the given signaling message by setting a port parameter of the non-compliant media description to zero;
   (d) updating the given signaling message; and
   (e) forwarding the given signaling message or any updated SDP signaling message to its original destination.

11. The method as described in claim 10 wherein the given SDP signaling message is an SDP offer embedded in a SIP request message, or an SDP offer embedded in a SIP response message.

12. The method as described in claim 10 wherein step of updating the given SDP signaling message rewrites one or more message headers or one or more message bodies.

13. The method as described in claim 10 wherein a given media description includes a media attribute that is evaluated against the media control policy.

14. The method as described in claim 10 wherein the media control policy is generated in an off-line process.

15. The method as described in claim 10 wherein the signaling path is monitored external to a media path between the entities.

16. A machine-implemented method operative within a signaling path between given entities that are attempting to set up a media session via transfer of signaling messages that conform to the Session Description Protocol (SDP), comprising:
  (a) receiving a media control policy that includes at least one rule, the rule specifying a particular action to be taken with respect to a media session as a function of a condition stated in the rule, where the condition is ascertainable from information in a media description of a signaling message;
  (b) monitoring the signaling path for a given SIP signaling message containing an SDP offer;
  (c) upon receipt of a given SIP signaling message containing a given SDP offer, and for each media description within the given SDP offer:
    (i) determining whether the media description is compliant with the media control policy by reference to the media description or to any session-level or media-level attributes of the given SDP offer that apply to the media description;
    (ii) if as a result of step (b)(i) the media description is determined to be compliant with the media control policy, verifying that a given media format in the media description is allowed by the media control policy by reference to a media format code, to any attributes that may apply to the given media format, or to any characteristics of the media session that may be derived from session-level or media-level information;
    (iii) if as a result of step (b)(ii) the given media format is determined to be not allowed by the media control policy, removing the media format code from the media format list and removing any associated attributes from the media description;
  (d) updating the given signaling message; and
  (e) forwarding the given signaling message to its original destination.

17. The method as described in claim 16 wherein if the media description is not compliant with the media control policy, further including the step of altering the media description by setting a given parameter of the media description to a value that indicates that the media session has been offered and cannot be accepted.

18. An apparatus, operative within a signaling path between given entities that are attempting to set up a media session via transfer of signaling messages that conform to the Session Description Protocol (SDP), wherein the given entities are compliant with the Session Initiation Protocol (SIP), comprising:
  a processor; and
  code, stored on a non-transitory computer-readable storage medium, executed in the processor to perform a method, comprising:
  (a) receiving a media control policy that includes at least one rule, the rule specifying a particular action to be taken with respect to a media session as a function of a condition stated in the rule, where the condition is ascertainable from information in a media description of a signaling message;
  (b) monitoring the signaling path for a given signaling message;
  (c) upon receipt of a given SDP signaling message:
    (i) determining whether any media description within the given signaling message is compliant or is non-compliant with the media control policy by evaluating the media description against the condition stated in the rule of the media control policy; and
    (ii) if any media description is non-compliant with the media control policy, modifying each media description for the given signaling message by setting a port parameter of the non-compliant media description to zero;
  (d) updating the given signaling message; and
  (e) forwarding the given signaling message or any updated SDP signaling message to its original destination.

19. The apparatus as described in claim 18 further including an interface through which the media control policy is defined.

* * * * *